United States Patent
Suga

(10) Patent No.: US 8,922,792 B2
(45) Date of Patent: Dec. 30, 2014

(54) IMAGE PROCESSING APPARATUS, AN INFORMATION PROCESSING METHOD, AND A COMPUTER-READABLE STORAGE MEDIUM FOR ACQUIRING DATA FROM A MEMORY

(75) Inventor: Tomoaki Suga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 877 days.

(21) Appl. No.: 12/339,624

(22) Filed: Dec. 19, 2008

(65) Prior Publication Data

US 2009/0161134 A1 Jun. 25, 2009

(30) Foreign Application Priority Data

Dec. 20, 2007 (JP) ................................. 2007-328720

(51) Int. Cl.
| | |
|---|---|
| G06F 3/12 | (2006.01) |
| G06F 15/00 | (2006.01) |
| G06K 1/00 | (2006.01) |
| G03G 15/00 | (2006.01) |
| H04N 1/46 | (2006.01) |

(52) U.S. Cl.
CPC ............... *H04N 1/46* (2013.01); *G03G 15/502* (2013.01)
USPC ........................... 358/1.13; 358/1.15; 358/1.9

(58) Field of Classification Search
None
See application file for complete search history.

(56) References Cited

U.S. PATENT DOCUMENTS

| | | | | |
|---|---|---|---|---|
| 2001/0004268 A1* | 6/2001 | Kubo et al. | ............... | 348/333.02 |
| 2002/0044295 A1* | 4/2002 | Tanaka | ......................... | 358/1.13 |
| 2003/0220988 A1* | 11/2003 | Hymel | ............................ | 709/220 |
| 2004/0054863 A1* | 3/2004 | Harada et al. | ................... | 711/164 |
| 2004/0145770 A1* | 7/2004 | Nakano et al. | ................ | 358/1.15 |
| 2005/0041035 A1* | 2/2005 | Nagatomo et al. | ............. | 345/601 |
| 2006/0055976 A1* | 3/2006 | Ueno | ............................ | 358/1.16 |
| 2008/0195242 A1* | 8/2008 | Tidwell | .......................... | 700/103 |

FOREIGN PATENT DOCUMENTS

| | | |
|---|---|---|
| JP | 09-146737 | 6/1997 |
| JP | 2000-235446 A | 8/2000 |
| JP | 2004-086861 A | 3/2004 |
| JP | 2005-102126 A | 4/2005 |
| JP | 2005-141883 A | 6/2005 |
| JP | 2006-060271 A | 3/2006 |
| JP | 2006-108749 A | 4/2006 |
| JP | 2007-036576 A | 2/2007 |
| JP | 2009-151535 A | 7/2009 |

OTHER PUBLICATIONS

Microsoft Windows XP—See what's on your computer, <http://web.archive.org/web/20071024014633/http://www.microsoft.com/resources/documentation/windows/xp/all/proddocs/en-us/app_mycomputer.mspx?mfr=true> Oct. 24, 2007.*
Extending the Windows Explorer with Name Space Extensions by David Campbell <http://www.microsoft.com/msj/archive/S332.aspx> dated Dec. 13, 2003.*

* cited by examiner

*Primary Examiner* — Ming Hon
(74) *Attorney, Agent, or Firm* — Canon USA Inc. IP Division

(57) ABSTRACT

In an apparatus connected to a plurality of input devices, in the case of a browsing mode of images stored in a device from which images are input, a user is allowed to select, in parallel, from the images stored in the input device and images showing interfaces capable of connecting to the other devices. Further, if an image indicating an interface is selected, the interface changes to an input mode of image data. Thus, the user is allowed to input image data from the other input devices without returning to the setting screen of an input device in such a mode.

23 Claims, 11 Drawing Sheets

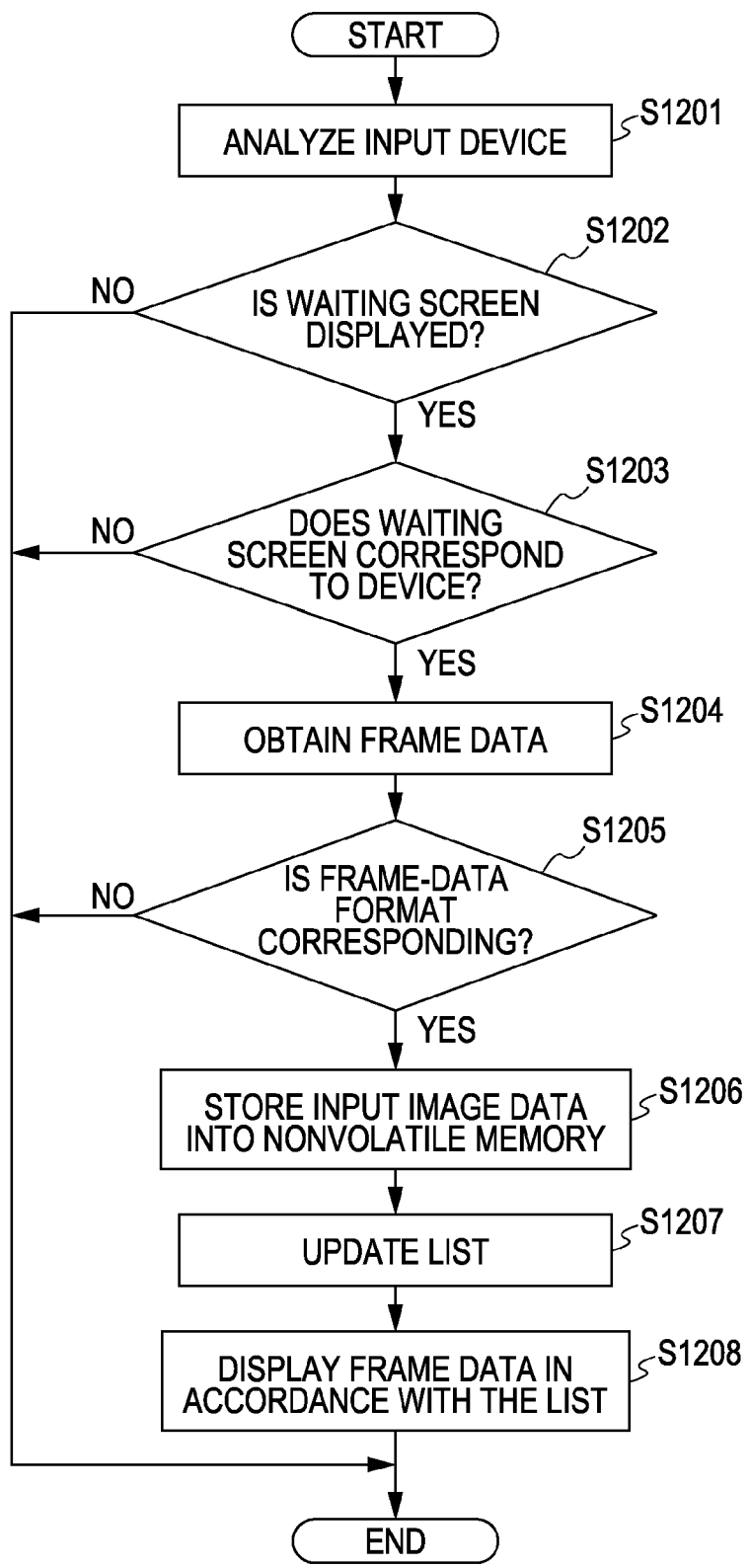

IMAGE PROCESSING APPARATUS, AN INFORMATION PROCESSING METHOD, AND A COMPUTER-READABLE STORAGE MEDIUM FOR ACQUIRING DATA FROM A MEMORY

BACKGROUND OF THE INVENTION

1. Field of the Invention

The present invention relates to an image processing apparatus capable of directly printing image data without using a PC. More particularly, the present invention relates to an image processing apparatus capable of handling image data stored in various devices through a simple user interface.

2. Description of the Related Art

In recent years, image processing apparatuses having multiple and improved functions, and having the capability of directly printing image data without using a PC are being widespread. Such image processing apparatuses are often provided with user interfaces allowing graphic representations in order for a user to use multiple functions as easily as possible.

However, the capability of multiple functions sometimes makes the user interface complicated, and thus the user operations sometimes become complicated. For example, recent image processing apparatuses are provided with interfaces for various devices, and are capable of handling image data of different devices, such as a memory card, a flash memory, a hard disk, etc. When a plurality of devices are simultaneously connected to such an image processing apparatus, the operation by the user has been effective to one device to date, and the other devices are excluded from the target of the user operation. Accordingly, when the user changes a device to be operated among a plurality of devices connected to the image processing apparatus, the setting work of the device sometimes become troublesome for the user. For example, when the user proceeds menu screens a plurality of times in order to do this work, it becomes necessary for the user to select items on screens by operating keys, etc., and thus the operations becomes complicated.

In order to address such a situation, for example, Japanese Patent Laid-Open No. 09-146737 has disclosed a technique in which selection of a medium and determination of an outputting device are carried out on one screen without changing display screens. This technique has reduced the user load and improved the operational performance.

In this regard, in the description of the above-described patent document, on a screen for selecting a device, an outputting device is determined from a plurality of connected devices. However, on the other hand, if a plurality of input devices are connected, it is thought that a user selects desired data from data stored in the devices. That is to say, in the technique disclosed in the above-described patent document, when a screen for selecting data stored in an input device is displayed, the user has to switch to a device selection screen once in order to select another device.

SUMMARY OF THE INVENTION

The present invention has been made in view of the above-described problem. An embodiment of the present invention provides an image processing apparatus capable of selecting an input device from a plurality of devices without explicitly switching to a device selection screen. Also, an aspect of the present invention provides an image processing apparatus having the configuration as follows. According to an embodiment of the present invention, there is provided an image processing apparatus having a plurality of interfaces for connecting devices, the apparatus including: a display unit configured to display an image, an operation unit configured to be operated by a user, an acquisition unit configured to acquire an image from a device connected to a first interface included in the plurality of interfaces, a display control unit configured to display the image acquired by the acquisition unit and an image indicating a second interface included in the plurality of interfaces on the display unit, a selection unit configured to select an image from a plurality of the images with the image displayed on the display control unit being changed each time there is an input from the operation unit, and a changing unit configured to change a mode of inputting an image through the second interface when the image indicating the second interface is selected by the selection unit.

Further features of the present invention will become apparent from the following description of exemplary embodiments with reference to the attached drawings.

BRIEF DESCRIPTION OF THE DRAWINGS

FIG. 12 is a flowchart illustrating a processing procedure when frame data is input from a device according to the second embodiment of the present invention into the image processing apparatus.

DESCRIPTION OF THE EMBODIMENTS

Figure 1:
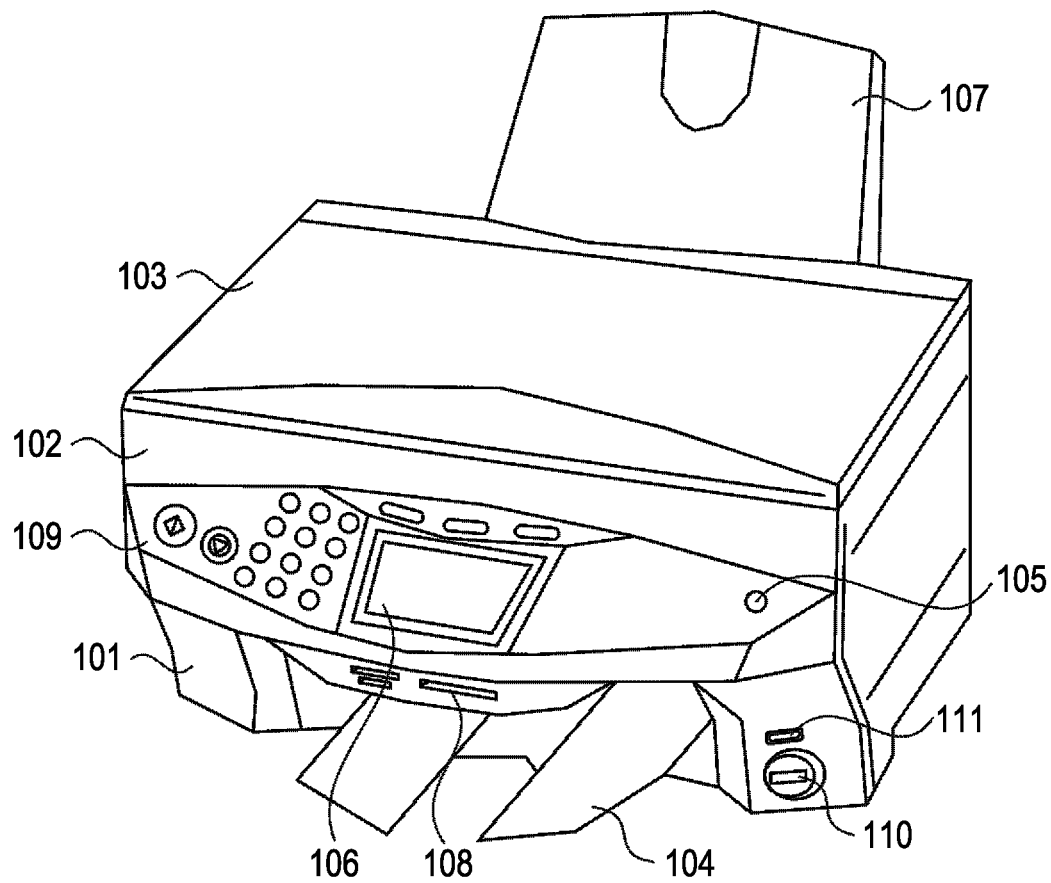
FIG. 1 is a schematic perspective view of an image processing apparatus according to a first embodiment of the present invention.

FIG. 1 is a schematic perspective view of an image processing apparatus 100 according to a first embodiment of the present invention. The image processing apparatus 100 includes a function of scanning image data from a scanner and printing the data in addition to a function of a normal PC printer, which receives data from a PC and prints the data. Also, the image processing apparatus 100 is provided with a function of directly accessing a removable external storage medium and printing. Further, the image processing apparatus 100 also includes a function of directly receiving image data from a digital camera and printing the data, and a function of directly receiving image data from a mobile terminal through infrared data communication or Bluetooth (registered trademark) and printing the data. For a recording method, any method may be used. In the present embodiment, in terms of a recording resolution, print quality, etc., it is assumed that the image processing apparatus is an ink-jet printer ejecting ink droplets onto a recording sheet using thermal energy.

In FIG. 1, a main unit, which forms an outer case of the image processing apparatus 100 according to the first embodiment of the present invention, has outer covering members, such as a lower case, a printer cover 102, a document plate cover 103, and a paper output tray 104. The lower case forms substantially lower half of the image processing apparatus 100, has an accommodation space accommodating individual mechanisms described below in the inside, and has an opening unit formed on the front face.

An end portion of the printer cover 102 is rotatably held by the lower case, and allows to open and close an opening unit formed on the upper face. By opening the printer cover 102, it becomes possible to replace a recording head cartridge (not shown in the figure), an ink tank (not shown in the figure), etc., contained in the main unit. In this regard, although not shown here in the figure in particular, when the printer cover 102 is opened, a protrusion formed on the back face rotates a cover-opening/closing lever. By detecting a rotational position of the cover-opening/closing lever by a micro-switch, etc., it is possible to detect an opening/closing state of the printer cover 102. Also, although not shown here in the figure in particular, a conveying unit of a print medium is contained in the lower case. Further, a scanner unit (not shown in the figure) is contained inside of the printer cover 102. An end portion of the document plate cover 103 is rotatably held by the printer cover 102. By opening the document plate cover 103, it is possible to access the scanner disposed inside of the printer cover 102. Also, by closing the document plate cover 103, it is possible to protect scanning surface of the scanner.

An end portion of the paper output tray 104 is held in the opening portion of the lower case. When a recording operation is carried out, a print medium can be output from here, and the output medium can be piled in sequence.

A power key 105 is pressably disposed on the right surface of the printer cover 102. Also, a liquid-crystal display unit 106 allowing displaying a menu and a guide for displaying a user interface, selected image data, etc., is disposed in the middle of the printer cover 102. Further, an operation panel 109 including various key switches is disposed on the left surface of the printer cover 102.

Reference numeral 107 denotes an automatic feeding unit, which automatically feeds a print medium into the printer main unit. Reference numeral 108 denotes a card slot. By inserting a memory card into here, it is possible to directly import image data stored in the memory card to allow printing. The memory card includes, for example, a compact flash memory, an SD card, a memory stick, etc. Reference numeral 110 denotes a connector terminal (USB terminal) for connecting to an external apparatus. For example, a digital camera, an external optical disc, a Bluetooth receiving devices, etc., are connected to the connector terminal in order to receive image data directly. Reference numeral 111 is a photo detector receiving infrared rays, and the photo detector is used for performing infrared data communication. In this regard, a connector terminal (USB connector) for connecting a PC is disposed on the back face of the image processing apparatus 100.

Figure 2:
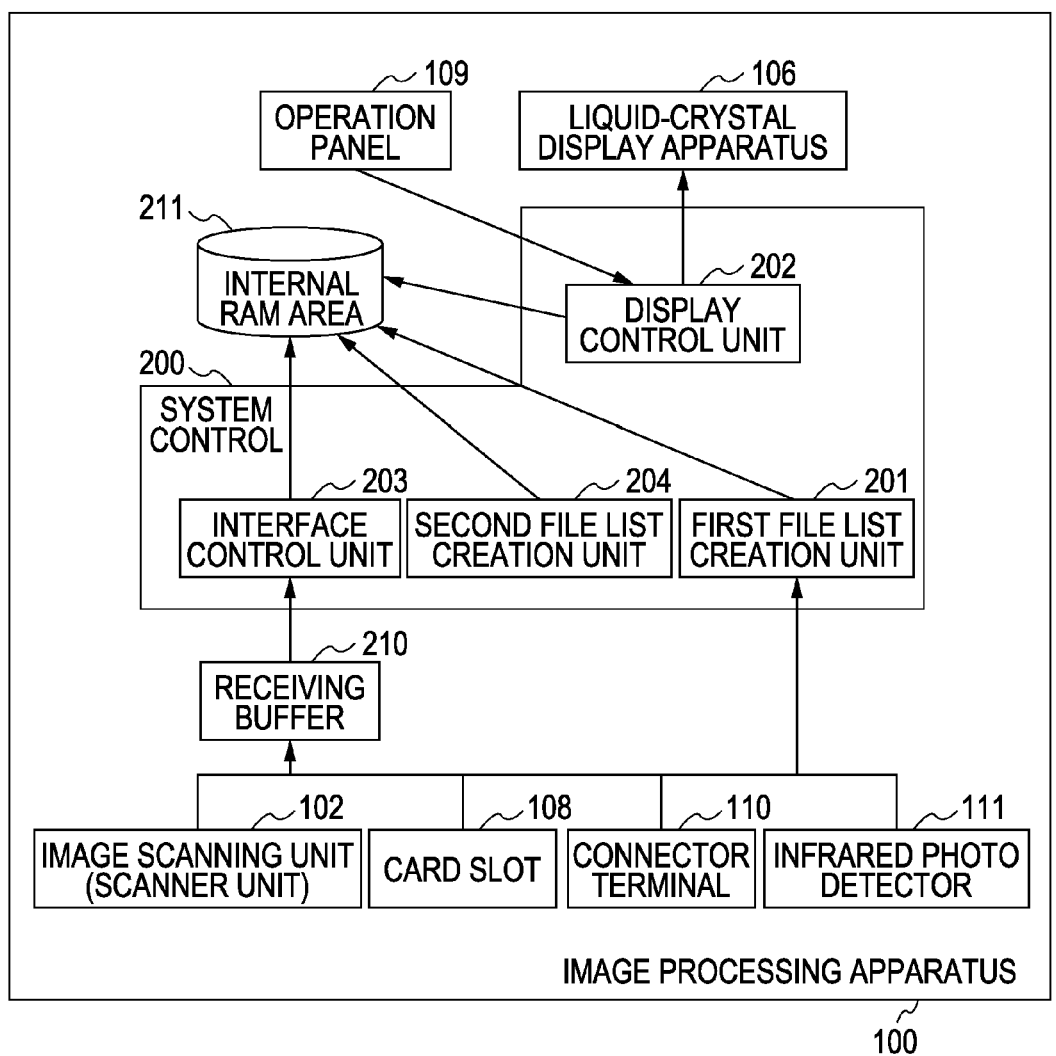
FIG. 2 is a block diagram of the image processing apparatus according to the first embodiment of the present invention.

FIG. 2 is a block diagram of the image processing apparatus 100 according to the first embodiment of the present invention. As described above, the image processing apparatus 100 has a function of connecting to a PC and perform printing. Also, the image processing apparatus 100 has a function of directly connecting to an image pickup apparatus, such as a digital camera, etc., and external optical disc apparatus for printing, a function of directly accessing a memory card used for a digital camera, etc., to read image data for printing, and a function of printing image data scanned by the scanner. Further, the image processing apparatus 100 has a function of printing image data received through infrared data communication.

In order to achieve these functions, the image processing apparatus 100 includes the connector terminal 110 described above in FIG. 1, which is an interface with an external connection apparatus, the card slot 108 described above in FIG. 1, which is an interface with a memory card, and an image scanning unit 102 by a scanner, etc., described above in FIG. 1. Further, the image processing apparatus 100 includes the infrared-ray photo detector 111 described above in FIG. 1, which receives infrared rays. Also, the image processing apparatus 100 includes a liquid-crystal display unit 106 and an operation panel 109.

A system control unit 200 is a control unit controlling the overall apparatus, and includes the following components. Reference numeral 201 is a first file list creation unit, and the first file list creation unit 201 creates a list of image data in a device determined in advance, which is connected to the image processing apparatus 100, for example, a memory card loaded in the card slot 108. Further, a device connected to or allowed to be connected to the image processing apparatus is added to the file list as device information for a device item from which image data is obtained in addition to the memory card.

Figure 3:
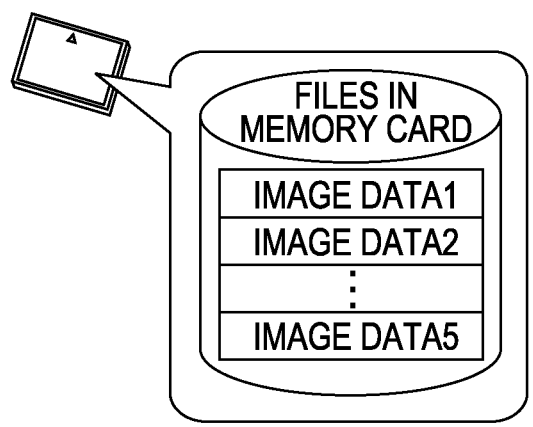
FIG. 3 is an example of a memory card storing image data.
Figure 4:
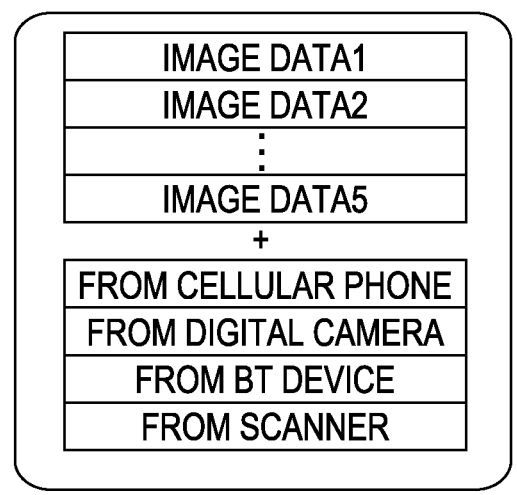
FIG. 4 is an example of a list created by a first file list creation unit from the memory card in FIG. 3.

For example, if a memory card shown in FIG. 3 is inserted into the image processing apparatus 100, the first file list creation unit creates a list as shown in FIG. 4. The list includes items, such as image data 1 to 5 in the memory card, and a cellular phone, a camera, a Bluetooth® (BT) device, a scanner as the input target device.

Reference numeral 202 denotes a display control unit, and the display control unit 202 displays the user interface, the list created by the first file list creation unit, and the image data obtained from the input target device to the liquid-crystal display unit 106. When a display item is an input target device, the display control unit 202 displays that as device information on the liquid-crystal display unit 106.

Reference numeral 203 denotes an interface control unit. If a device is selected as an input target device when device information of the device is displayed on the liquid-crystal display unit 106, the image processing apparatus 100 stored image data temporarily from the input target device to an internal RAM area 211.

Reference numeral 204 denotes a second file list creation unit. The second file list creation unit 204 creates a list produced by adding image data temporarily stored in the internal RAM area 211 to the list created by the first file list creation unit. Also, when image data is input from a device which has not been connected to the image processing apparatus 100 at the time of the creation of the list by the first file list creation unit, the information is added to the list created by the first file list creation unit.

Figure 5:
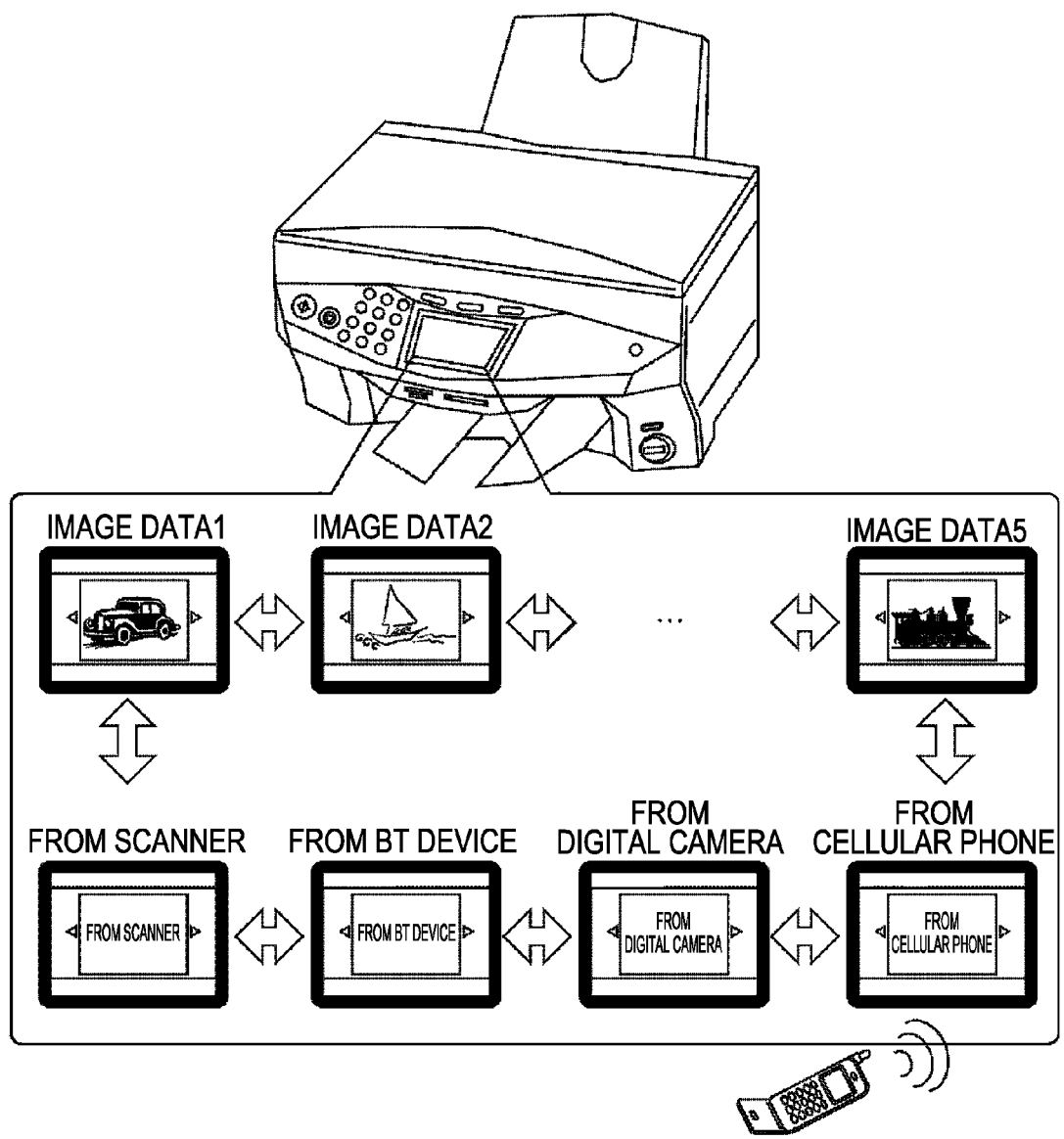
FIG. 5 is an example of a display of image data in accordance with the list in FIG. 4.

For example, as shown in FIG. 5, when image data is displayed on the basis of the image data list (FIG. 4) created by the first file list creation unit, the image data is being displayed in sequence by operating the operation panel 109.

Figure 6:
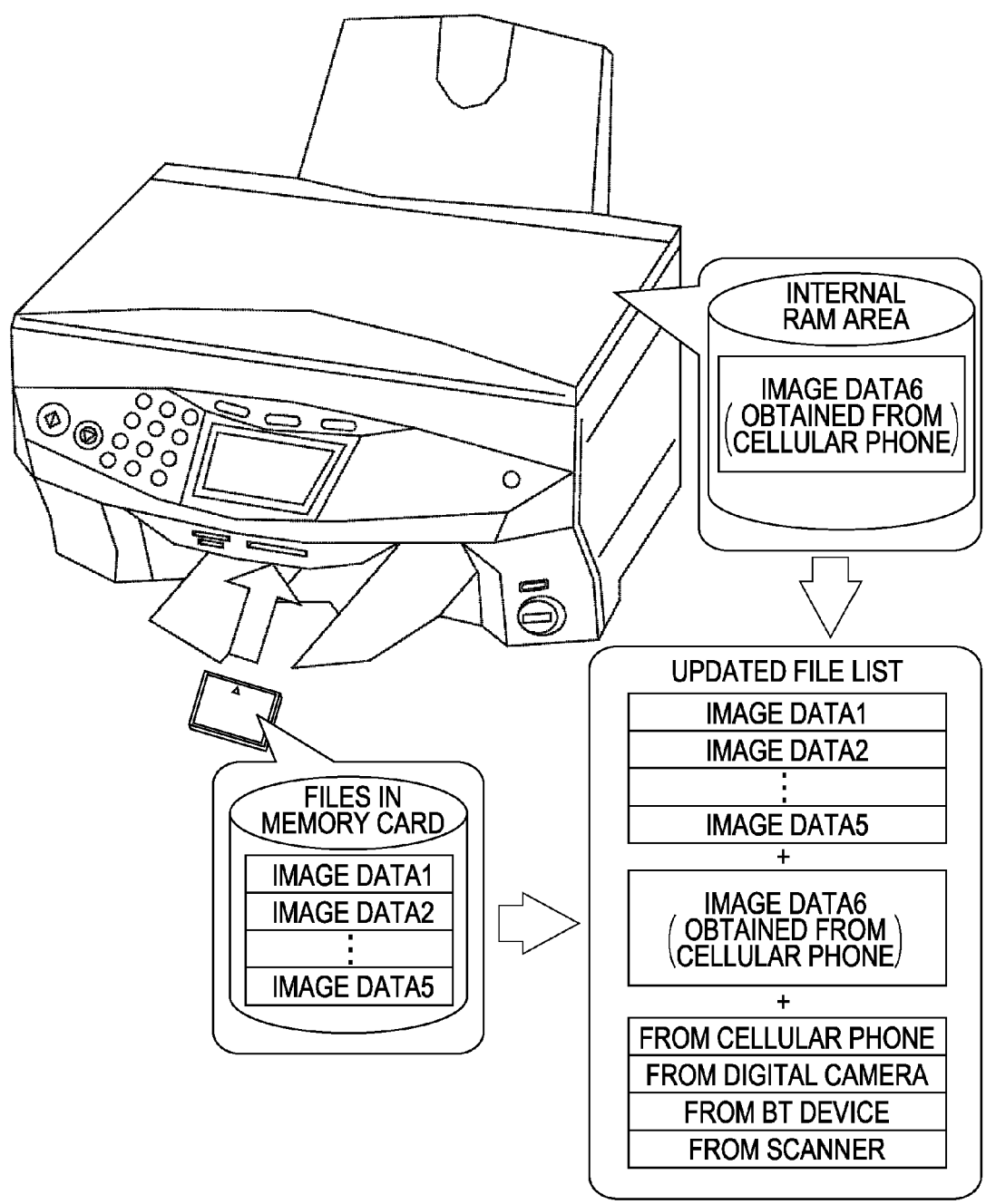
FIG. 6 is an example of a list created by a second file list creation unit when a file is input from another device.

When device information accepting a file input from a cellular phone is displayed, if image data is input from the cellular phone into the image processing apparatus 100 through infrared data communication, image data 6 input from the cellular phone is added to the list as shown in FIG. 6.

Reference numeral 210 denotes a receiving buffer. The receiving buffer 210 receives image data sent to the image processing apparatus 100 through the image scanning unit 102, the card slot 108, the connector terminal 110, and the infrared-ray photo detector 111, and temporarily holds the data.

Reference numeral 211 denotes an internal RAM area. The internal RAM area 211 temporarily stores image data contained in the receiving buffer 210, and allows the system control unit 200 to freely access the data. Also, the image data input from each input device and the list of the image data are also stored in this area.

Figure 7:
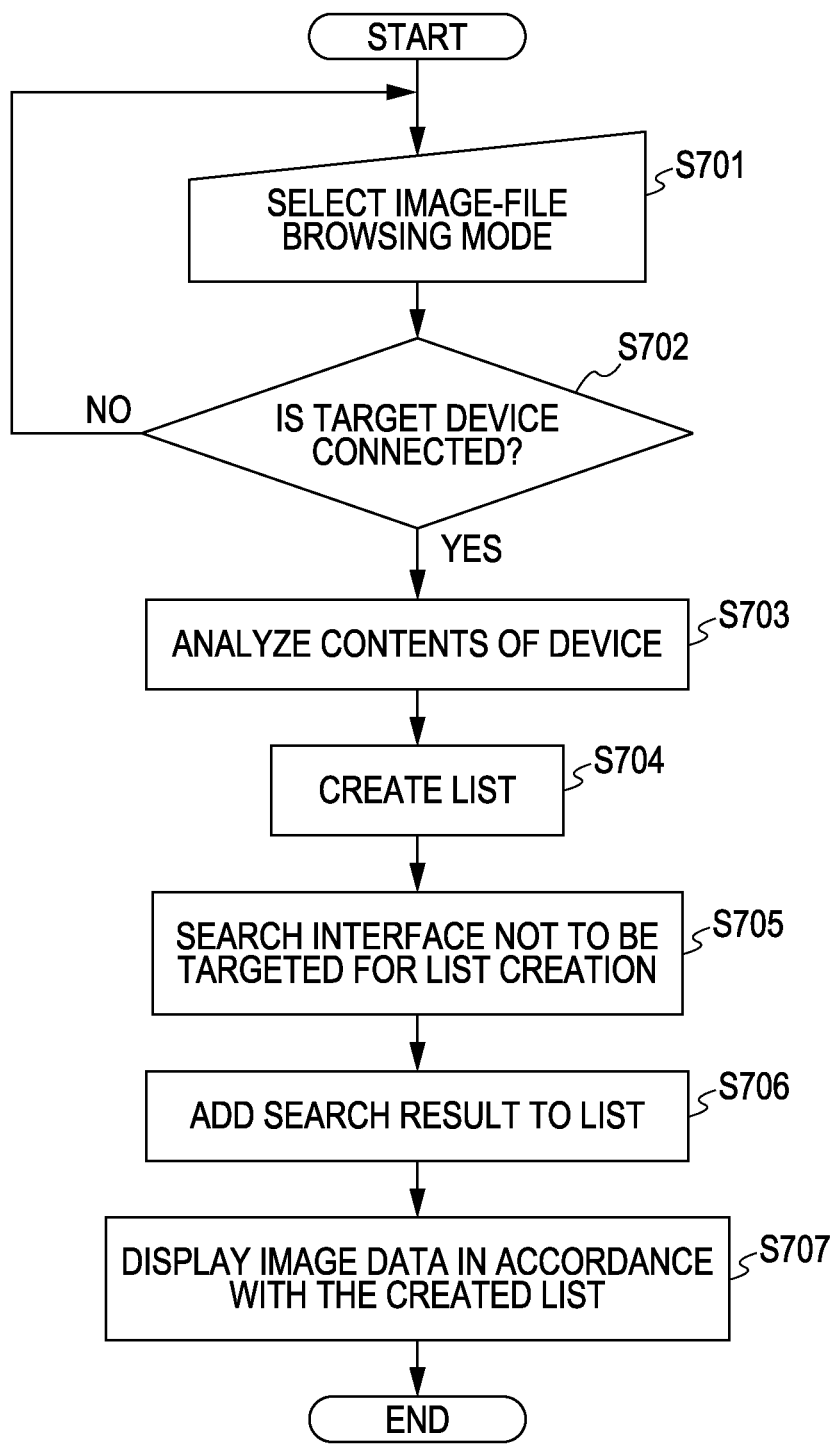
FIG. 7 is a flowchart illustrating a processing procedure when image data according to the first embodiment of the present invention is displayed on a liquid-crystal display unit 106.

FIG. 7 is a flowchart illustrating a processing procedure when image data according to the first embodiment of the present invention is displayed on the liquid-crystal display unit 106.

First, in step S701, processing is performed to wait for the user to set to a browsing mode for browsing image data using the operation panel 109. Here, the browsing mode is a mode for displaying a list which is created by the first file list creation unit or the second file list creation unit. In the browsing mode, the target to be browsed includes image data and the device information of the input target device.

In step S702, the system control unit 200 determines whether device from which data is input in the browsing mode is connected to the image processing apparatus 100. In the present embodiment, the input target devices are the scanner 102, a memory card that can be inserted into the card slot 108, a digital camera that can be connected to the connector terminal 110, a cellular phone that can be connected to the infrared-ray photo detector 111. The user selects at least one device from these devices. If the selected device is connected to the image processing apparatus 100, the processing proceeds to step S703. Here it is assumed that a memory card is connected. If a memory card is not connected, the processing returns to step S701.

In step S703, the system control unit 200 determines whether there is image data in the memory card. In step S704, if it is determined that there is image data in the memory card, the first file list creation unit obtains image data and creates a list. The obtained image data and the created list are stored in the internal RAM 211. In step S705, the system control unit 200 searches an interface to which a device is connected, or an interface to which a device can be connected except the card slot 108. Devices that are connected here include a scanner, a digital camera, a BT device, and a cellular phone. In step S706, a device that is connected to the interface searched by the first file list creation unit in step 705 is added to the image data list. Here, the scanner, the digital camera, the BT device, and the cellular phone, which can be connected to the image processing apparatus 100, are added to the list. In step S707, the display control unit 202 displays image data 1 to 5, and the images indicating that data can be input from the scanner, the digital camera, the BT device, and the cellular phone on the liquid-crystal display unit 106 in accordance with the list created by step 706. Thus, it becomes possible for the user to select image data 1 to 5 and input devices in parallel. Accordingly, when only one image can be displayed in the browsing mode as shown in FIG. 5, it is possible for the user to select an input device in the same manner as the operation for selecting a usual image. Also, in particular, when an input device is added to the end of the list as shown in FIG. 6, as soon as the user completes browsing the images included in the input device, the user is allowed to recognize that the user can input data from another input device.

In this regard, in S705, the user may search the connected devices or the devices that can be connected. Also, in this case, the user may search the type of the searched device. Also, in the above-described example, the user may not search the scanner, because the scanner is included in the image processing apparatus 100.

Also, in FIG. 5, images indicating input devices, such as a "digital camera", and a "cellular phone" are displayed as images displayed in S707. However, the input devices are not limited to these. The images indicating "Bluetooth", "IrDA", and the interfaces may be displayed. That is to say, the display may be any one of displays such that the user can recognize that the image is input from the other input device, and the user is allowed to input image data.

Further, when the user selects an image indicating an input device displayed in step S707 in FIG. 7, the apparatus proceeds to an image-data input mode.

That is to say, if the user selects a scanner or a digital camera, the apparatus scans a document or reads image data from the connector terminal 110, respectively. In this case, the user can omit the operation of inputting the image data.

On the other hand, If the user selects a BT device or a cellular phone, a wireless communication unit, such as an infrared-ray photo detector 111 is changed to a mode of receiving data from an external apparatus. In this case, the user can omit the operation of switching the wireless communication unit to the receiving mode.

Figure 8:
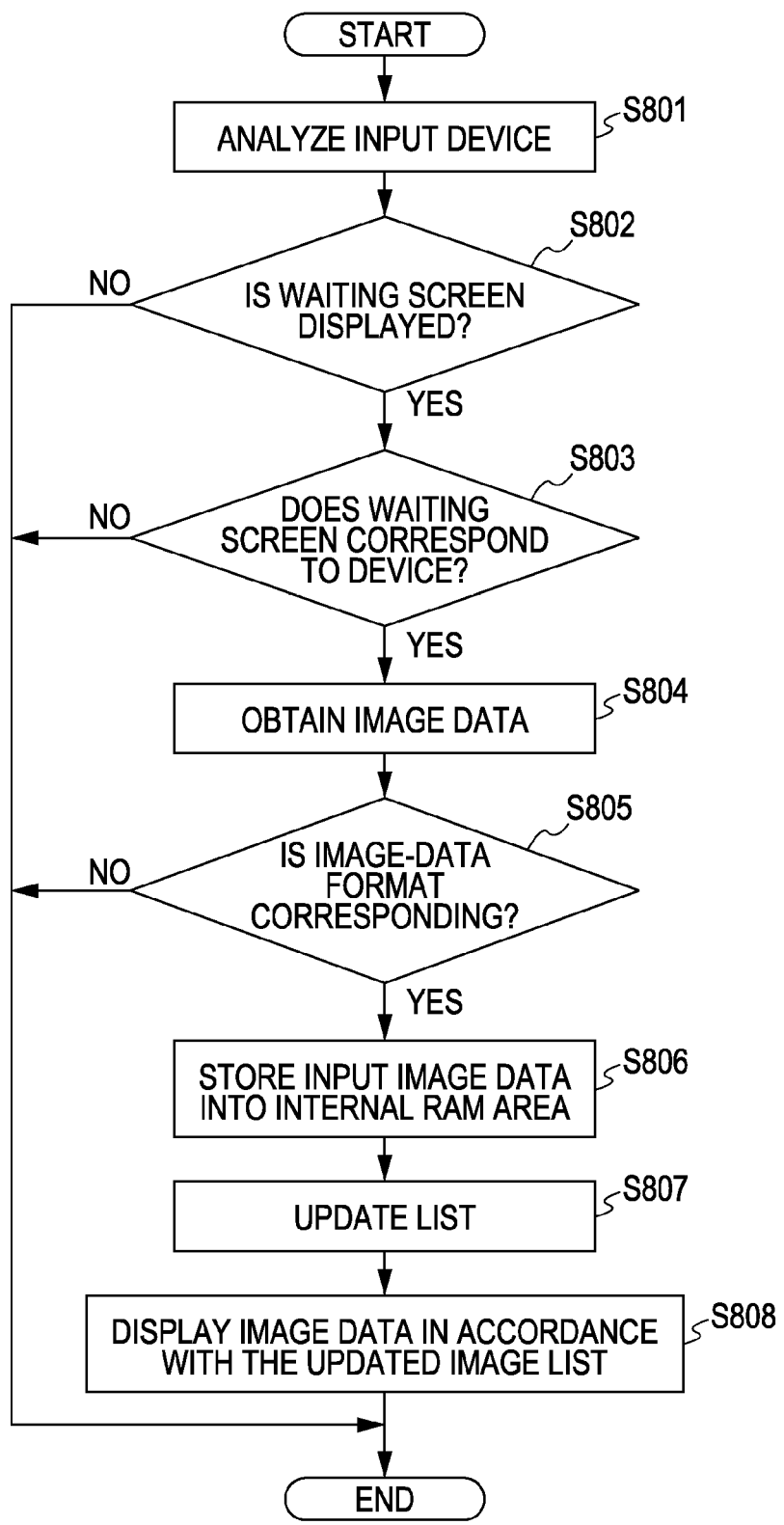
FIG. 8 is a flowchart illustrating a processing procedure when image data is input from a device according to the first embodiment of the present invention into the image processing apparatus.

FIG. 8 is a flowchart illustrating a processing procedure when image data is input from a device other than a memory card, according to the first embodiment of the present invention into the image processing apparatus 100. First, in step S801, the interface control unit 203 detects from which device image data is input, that is to say, the image data of which device has been input. Here, it is assumed that the device is a cellular phone. In step S802, the system control unit 200 determines whether the device information indicating that image data can be input from a cellular phone is displayed on the liquid-crystal display unit 106. If the device information is displayed (YES in step S802), the processing proceeds to step S803. If not displayed (NO in step S802), the processing is terminated. In step S803, a determination is made on whether the device detected by the system control unit 200 in step S801 and the device whose device information is displayed on the liquid-crystal display unit 106 match. If both of the devices match (YES in step S803), the processing proceeds to step S804. If they do not match (NO in step S803), the processing is terminated. Also, when the processing is terminated, if there is device information of the device to be the target in the list, the user may change to that device information.

In step S804, the interface control unit 203 obtains image data from the cellular phone from which a file is input to the image processing apparatus 100, and stores the image data into the receiving buffer 210. In step S805, the interface control unit 203 analyzes the image data received in step S804, and determines whether the format of the image data is supported by the image processing apparatus, for example, the JPEG format. If the format conforms to the JPEG format (YES in step S805), the processing proceeds to step S806. If the format does not conform to the JPEG format (NO in step S805), the processing is terminated. Also, before completing the processing, a warning screen stating that the file format is different may be displayed. In step S806, the interface control unit 203 temporarily stores the image data stored in the receiving buffer 210 in step S804 into the internal RAM area 211.

In step S807, the second file list creation unit adds the image data newly input from the cellular phone to the list created by the first file list creation unit so that the image data can be handled in the same way as the image data on the list created by the first file list creation unit. In step S808, the display control unit 202 displays image data and the input target device in accordance with the list updated in S807 on the liquid-crystal display unit 106. The display control unit 202 controls in accordance with an instruction by the user from the operation unit to change display in sequence, or to automatically change the list display by a slide show.

As described above, the images obtained from the input device in accordance with the created list and the images indicating interfaces to which the other devices are connected are displayed in parallel. Thus, it is possible to save time for changing menu screens in order for the user to select image data and input devices.

In this regard, in the first embodiment, image data has been the target. However, sentence files may be the target.

Also, in the first embodiment, an input target device is added to the list even if the device is not connected to the image processing apparatus 100. However, devices that are actually connected to the image processing apparatus 100 may be detected, and only the detected devices may be added to the list. Also, an item indicating that input from any device is received as far as the device is supported by the image processing apparatus 100 may be added. Assuming that a device is not connected when the user selects the screen indicating the interface, the processing may be performed to prompt the user to connect the device. Various methods, such as displaying or issuing a warning sound may be used for the way of the prompting.

Also, in the first embodiment, a device from which image data list is created first is determined by the user selecting the image data in the browsing mode. However, on the basis of priorities determined in advance among the connected devices, a device having a highest priority may be the target from which image data list is created first.

Also, any devices from a plurality of devices may be set as devices from which a image data list is created, for example, a memory card and a digital camera, and one list may be created by grouping the image data held by the set devices.

Figure 9:
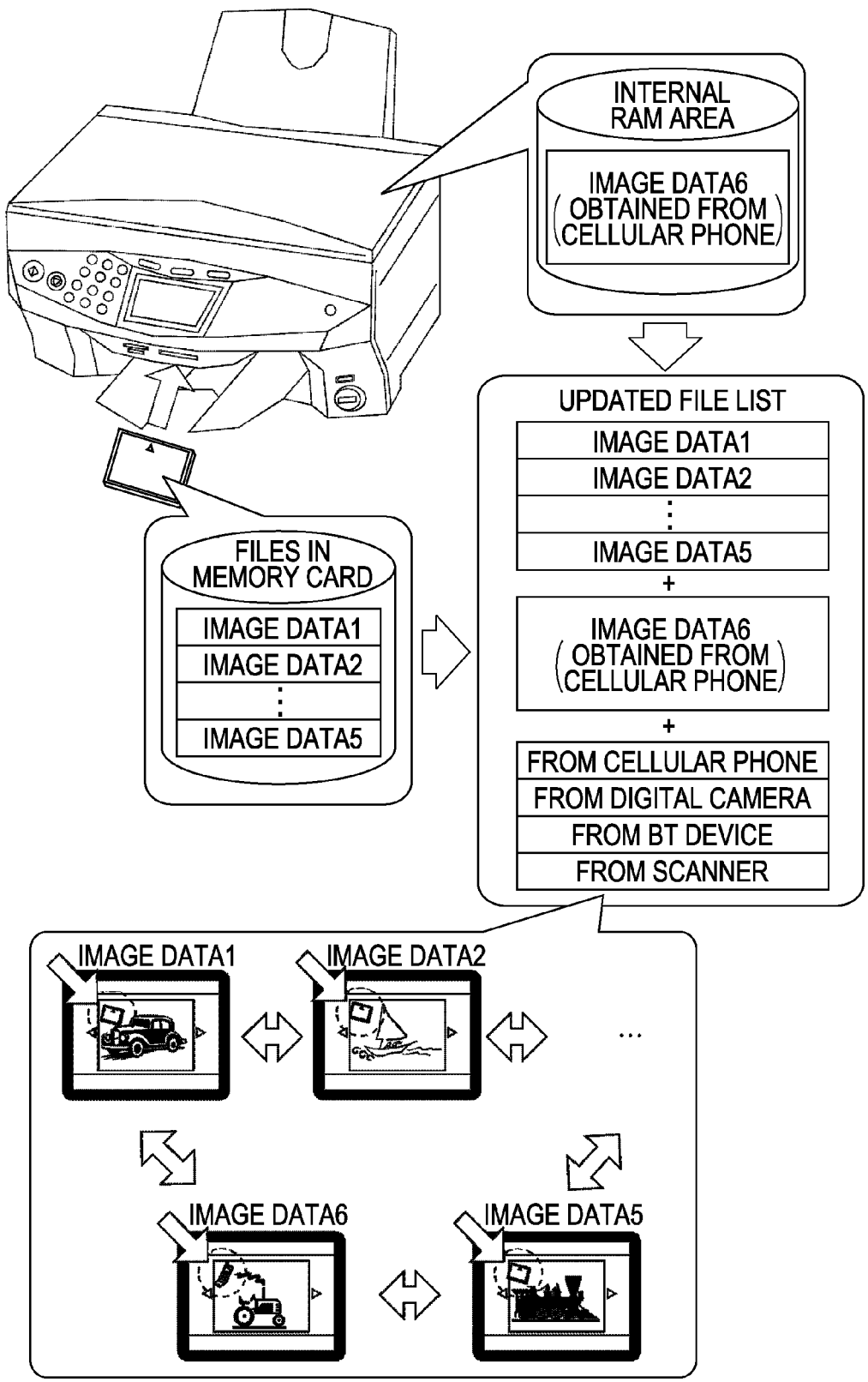
FIG. 9 is an example of displaying image data, on a liquid-crystal display unit, with a mark indicating a device in which the image data is stored.

Further, in the first embodiment, when image data is displayed on the liquid-crystal display unit 106, a type indicating a device in which image data is stored as shown in FIG. 9 may be displayed by a mark or a character. Thus, when the user confirms the image related to images obtained from, for example, a cellular phone, the user knows that the user should confirm the cellular phone.

In the first embodiment, the input files are temporarily stored in the internal RAM area. Accordingly, the contents that are temporarily stored are deleted at the timing of turning the power OFF, etc., and thus the contents cannot be stored for a long time. In a second embodiment, in consideration of this point, the image data is stored for a long time by storing the input image data into a nonvolatile data storage area.

Also, the user sometimes wants to browse and select frame data for decorating the image data obtained from the input device. Thus, it is also possible to create a list, for a selection target, including frame data for combining with the image data.

A schematic perspective view of an image processing apparatus 100 according to the second embodiment of the present invention is the same as that in FIG. 1. However, a block diagram of the image processing apparatus 100 varies slightly from that in FIG. 2. Thus, a description will be given of that point.

Figure 10:
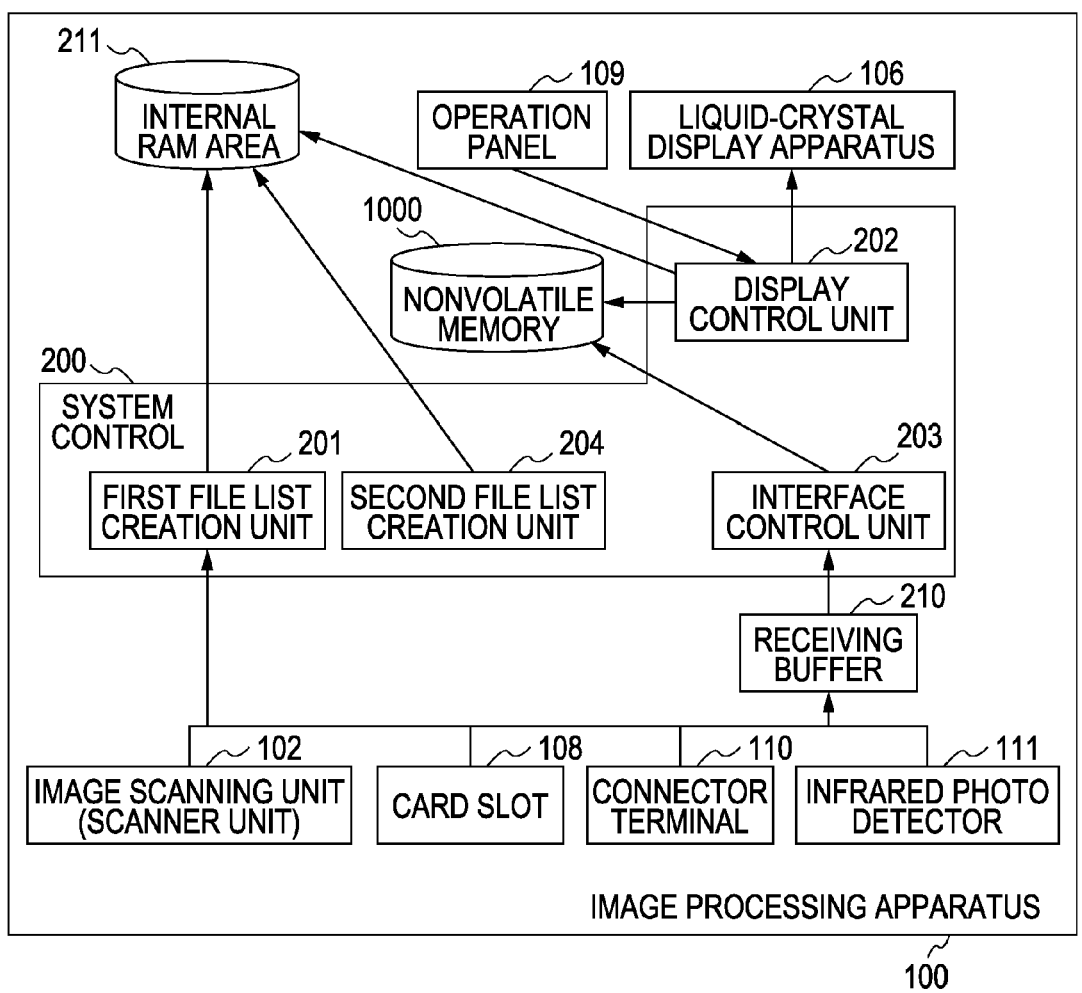
FIG. 10 is a block diagram of an image processing apparatus 100 according to a second embodiment of the present invention.

FIG. 10 is a block diagram of the image processing apparatus 100 according to the second embodiment of the present invention.

A system control unit 200 is a control unit controlling the overall apparatus, and includes the following components.

A first file list creation unit 201 creates a list of frame data obtained from the pre-determined devices connected to the image processing apparatus 100, and stores in the internal RAM area 211. For example, if a memory card is inserted in the card slot 108, the first file list creation unit 201 creates a list of frame data stored in the memory card, and stores the list into the internal RAM area 211. Further, the first file list creation unit 201 adds devices other than the memory card as items of device information in the browsing mode.

Reference numeral 202 denotes a display control unit. The display control unit 202 displays the frame data on the liquid-crystal display unit 106 in accordance with the created list. Reference numeral 203 denotes an interface control unit. When image data is input from the device whose device information is displayed to the image processing apparatus 100, the interface control unit 203 stores the input image data into the nonvolatile memory 1000 as frame data. Also, the interface control unit 203 adds additional information indicating that the data is frame data.

A second file list creation unit 204 adds the frame data stored in the nonvolatile memory 1000 to the list created in the internal RAM area. For example, the second file list creation unit 204 adds frame data from a cellular phone to the list, accumulated in the internal RAM area 211, on the frame data input from the memory card.

Figure 11:
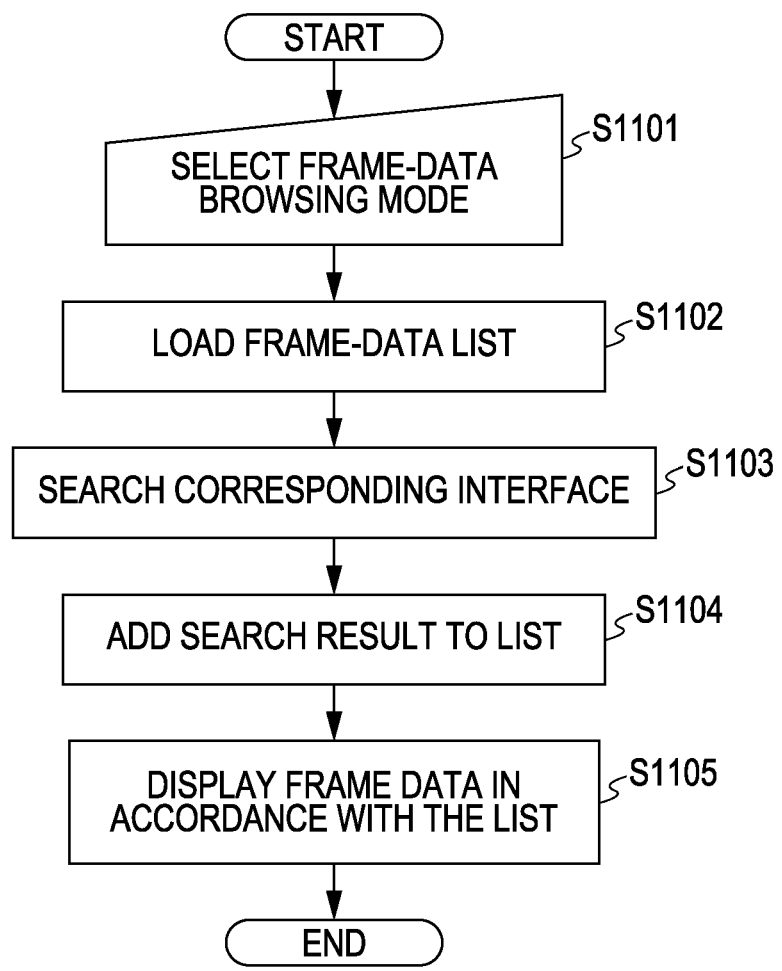
FIG. 11 is a flowchart illustrating a processing procedure when frame data according to the second embodiment of the present invention is displayed on the liquid-crystal display unit.

FIG. 11 is a flowchart illustrating a processing procedure when frame data file according to the second embodiment of the present invention is displayed on the liquid-crystal display unit 106. First, in step S1101, processing is performed to wait for the user to set to a browsing mode for browsing image data using the operation panel 109. In step S1102, a list of frame data held in advance in the nonvolatile memory 1000 is temporarily stored in the internal RAM area 211. In step S1103, the system control unit 200 searches an interface to which a device is connected, or an interface to which a device can be connected. In step S1104, a device that is searched by the first file list creation unit in step S1103 is added to the image data list. In step S1105, the display control unit 202 displays frame data on the liquid-crystal display unit 106 in accordance with the list created by step S1102.

FIG. 12 is flowchart illustrating a processing procedure when frame data is input from a device according to the second embodiment of the present invention into the image processing apparatus 100. Here, it is assumed that frame data is input from a device other than a memory card.

First, in step S1201, the interface control unit 203 obtains information of what device has input a file into the image processing apparatus 100. In step S1202, the system control unit 200 determines whether the device information is displayed on the liquid-crystal display unit 106. If the device information is displayed (YES in step S1202), the processing proceeds to S1203. If not displayed (NO in step S1202), the processing is terminated. In step S1203, a determination is made on whether the device obtained by the system control unit 200 in step S1201 and the device whose device information is displayed on the liquid-crystal display unit 106 match. If both of the devices match (YES in step S1203), the processing proceeds to step S1204. If they do not match (NO in step S1203), the processing is terminated. Also, when the processing is terminated, if there is device information of the other devices, the user may change to that device information.

In step S1204, the interface control unit 203 obtains frame data from the device from which frame data is input to the image processing apparatus 100, and stores the frame data into the receiving buffer 210. In step S1205, the interface control unit 203 determines whether the interface control unit 203 supports the format of the frame data received in step S1204. For example, a determination is made on whether the format of the frame data is an image data format. The image data format includes the PNG format.

If the format of the frame data is an image data format (YES in step S1205), the processing proceeds to step S1206. Also, if the format of the frame data is not an image data format (NO in step S1205), the processing is terminated. Also, before completing the processing, a warning screen stating that the data format is different may be displayed. In step S1206, the interface control unit 203 temporarily stores the image data stored in the receiving buffer 210 in step S1204 into the nonvolatile memory 1000. Also, additional information indicating the stored frame data is stored with a relationship.

In step S1207, the frame data stored in the nonvolatile memory 1000 is added to the list stored in the internal RAM area 211 in advance. Thus, the data can be handled in the same manner as the existing frame data. In step S1208, the display control unit 202 displays the frame data in accordance with the list updated in S1207 on the liquid-crystal display unit 106.

In this regard, in the second embodiment, additional information indicating frame data is added, because frame data is assumed to be in a scene of browsing mode. However, it goes without saying that if the data is handled as image data in the JPEG format other than frame data depending on the situation of the user interface, the case is included in the present invention.

Also, frame data and image data may be mixed to create one list. At this time, additional information is effective in order to distinguish frame data from image data. Also, in the second embodiment, frame data is stored in the nonvolatile memory 1000. However, it goes without saying that if frame data is stored in a hard disk or a storage apparatus, the case is included in the present invention.

Also, in the above-described embodiment, a printer having a printing function as an image processing apparatus has been taken as an example. However, the present invention is not limited to this. For example, the present invention may be applied to, for example, a digital camera having a function of shooting, a display unit displaying digital images, and a so-called notebook-sized PC (Personal Computer).

Also, the present invention can be applied to an apparatus which can receive input of an instruction from an external device and can display an image to an external display unit without having a display unit and operation unit in the apparatus just like a so-called a desk-top PC. Also, the present invention can be achieved by supplying a storage medium recording program code implementing the functions of the above-described embodiments to a system or an apparatus, and by executing the program code in a computer (or a CPU, MPU) of the system or the apparatus. In this case, the program code read from the storage medium achieves the functions of the above-described embodiments, and the storage medium storing the program code, itself, constitutes the present invention.

The storage medium for supplying such program code includes a hard disk, a CD-ROM, a CD-R, a nonvolatile memory card, a DVD, etc.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-328720 filed Dec. 20, 2007, which is hereby incorporated by reference herein in its entirety.

What is claimed is:

1. An apparatus comprising:
   a display control unit configured to cause a display apparatus to display either an image data item of first image data stored in a memory or a device item of device information corresponding to a device storing second image data, the image data item and the device item being included in a list;
   a changing unit configured to sequentially change, in a case where a plurality of image data items and a plurality of device items corresponding to devices are included in the list, an item to be displayed by the display control unit among the plurality of image data items and the plurality of device items according to an order in the list, every time a predetermined operation is executed by a user; and
   an acquisition unit configured to acquire the second image data from the device corresponding to the device item being displayed by the display control unit, in a case where the device item is displayed according to the change by the changing unit among the plurality of image data items and the plurality of device items.

2. The apparatus according to claim 1, further comprising:
   a detecting unit configured to detect a type of device connected to the apparatus,
   wherein the display control unit causes the display apparatus to display the device item indicating the type of device detected by the detecting unit.

3. The apparatus according to claim 1, wherein the display control unit causes the display apparatus to display the device item corresponding to a device which has been connected to the apparatus, and the acquisition unit acquires the second image data from the device.

4. The apparatus according to claim 1, further comprising:
   a first generation unit configured to generate the list.

5. The apparatus according to claim 1, further comprising:
   a second generation unit configured to generate a list including a second image data item of the acquired second image data,
   wherein the display control unit causes the display apparatus to display the second image data item included in the list generated by the second generation unit.

6. The apparatus according to claim 5, wherein the second generation unit generates the list in which the second image data item is added to the list generated by the first generation unit, and the display control unit causes the display apparatus to further display the second image data item.

7. The apparatus according to claim 5, wherein the display control unit adds an item for distinguishing the second image data item from the image data item of the first image data.

8. The apparatus according to claim 5, wherein the display control unit causes the display apparatus to display both the second image data item and the image data item of the first image data according to the change by the changing unit.

9. The apparatus according to claim 5, wherein the display control unit causes the display apparatus to display the second image data item and the device item.

10. The apparatus according to claim 1, wherein the acquisition unit acquires the second image data from the device according to an operation by a user in a case where the device item corresponding to the device is displayed.

11. The apparatus according to claim 1, further comprising:
a storing unit configured to store the second image data, to the memory storing the first image data, in response to the acquisition.

12. The apparatus according to claim 1, wherein the display control unit causes the display apparatus to display the device item corresponding to a device which can be connected to the apparatus, and the acquisition unit acquires the second image data from the device in a case where the device is connected to the apparatus.

13. The apparatus according to claim 1, wherein, in a case where the device item is displayed by the display control unit, the apparatus is shifted to a mode in which the acquiring unit can acquire the second image data from the device corresponding to the device item.

14. The apparatus according to claim 13, wherein the mode is a mode in which at least the one device is connected with the apparatus.

15. The apparatus according to claim 1, further comprising a printing unit configured to print an image on a printing medium.

16. The apparatus according to claim 1, further comprising a reading unit configured to read an original.

17. The apparatus according to claim 1, wherein the display control unit causes the display apparatus to display an item indicating an interface which is used to connect the apparatus and the device storing the second image data, as the device item.

18. The apparatus according to claim 1, wherein the list is a file list for specifying a file to be displayed by the display control unit.

19. The apparatus according to claim 1, wherein the device item is next to a leading image data item or a last image data item in the list.

20. The apparatus according to claim 1, further comprising a determining unit configured to determine whether a device connected to the apparatus corresponds the device item displayed by the display control unit;
wherein the acquiring unit acquires the second image data from the device, in a case where the determining unit determines that the device corresponds the device item, and the acquiring unit does not acquire the second image data from the device, in a case where the determining unit does not determine that the device corresponds the device item.

21. The apparatus according to claim 1, wherein the display control unit causes the display apparatus to display the device item indicating a device type of the device storing the second image data.

22. A method of controlling an apparatus comprising:
displaying either an image data item of first image data stored in a memory or a device item of device information corresponding to a device storing second image data, the image data item and the device item being included in a list;
sequentially changing, in a case where a plurality of image data items and a plurality of device items corresponding to devices are included in the list, an item to be displayed by the display control unit among the plurality of image data items and the plurality of device items according to an order in the list, every time a predetermined operation is executed by a user; and
acquiring the second image data from the device corresponding to the device item being displayed, in a case where the device item is displayed according to the changing among the plurality of image data items and the plurality of device items.

23. A non-transitory computer-readable storage medium storing a program causing a computer to perform the method of controlling according to claim 22.

* * * * *